United States Patent [19]

Hudspeth

[11] 4,209,692
[45] Jun. 24, 1980

[54] ADJUSTABLE PHOTOELECTRIC DETECTOR

[75] Inventor: William Hudspeth, Norwell, Mass.

[73] Assignee: Polaroid Corporation, Cambridge, Mass.

[21] Appl. No.: 861,642

[22] Filed: Dec. 19, 1977

[51] Int. Cl.² ............... F16D 1/12; G01D 5/32; G03B 7/10; H01J 5/02
[52] U.S. Cl. ............... 250/239; 250/231 SE; 354/25; 403/96
[58] Field of Search ............... 354/25, 31, 195; 352/140; 350/271, 273, 275; 403/91, 97, 328, 96; 250/231 SE, 233, 234, 236, 239

[56] References Cited
U.S. PATENT DOCUMENTS

| 27,797 | 4/1860 | Hammon | 403/97 |
|---|---|---|---|
| 369,159 | 8/1887 | Burns | 403/328 X |
| 2,505,075 | 4/1950 | Weinberger | 403/96 X |
| 3,720,148 | 3/1973 | Harvey | 354/25 |
| 3,770,971 | 11/1973 | Somerset | 250/231 SE |
| 3,856,399 | 12/1974 | Hosoe et al. | 354/25 X |
| 3,875,610 | 4/1975 | Wubbe | 15/250.3 S |
| 3,888,338 | 6/1975 | Mars | 192/142 |
| 3,902,063 | 8/1975 | Oelsch et al. | 250/231 SE X |
| 4,043,642 | 8/1977 | Hirose et al. | 354/195 X |

Primary Examiner—L. T. Hix
Assistant Examiner—Thomas H. Tarcza
Attorney, Agent, or Firm—David R. Thornton

[57] ABSTRACT

A mounting and positioning structure for photoelectric detector units used to generate pulses in response to rotational movement of an automatically focused camera lens. The detector is provided with an integral hollow housing supporting a photocell and a light source on an axis displaced from and parallel to the pivotal mounting axis of the detector. The housing is insertable directly under a cantilevered resilient latch member having a blade-like edge engageable with embossed serrations which radiate from the pivotal mounting axis along one surface of the detector housing. The latch retains the detector in the position so that the light path between the light source and the photocell may be calibrated precisely with a reference determinative of lens focusing position.

2 Claims, 7 Drawing Figures

ADJUSTABLE PHOTOELECTRIC DETECTOR

BACKGROUND OF THE INVENTION

This invention relates to automatic lens focusing mechanisms for photographic cameras and more particularly, concerns an improved photoelectric pulse generating unit for monitoring the focus position of a camera objective lens driven in response to a range detection system.

In a commonly assigned co-pending application Ser. No. 729,289, filed Oct. 4, 1976, in the name of Edwin K. Shenk, there is disclosed a camera lens focusing mechanism in which an electronic logic circuit responds to a range signal related directly to the camera-subject distance in a manner to produce a train of pulses, the number of which is representative of the lens mount axial position at which the subject will be in focus. Such pulses are gated into a counter and used for operating a drive motor coupled mechanically to the lens mount. The lens mount is coupled rotatably with an encoder wheel operative as a component of an auxiliary pulse generator in a feed-back system so that rotation of the drive motor under the control of the counter causes the auxiliary pulse generator to produce a predetermined number of pulses with displacement of the lens mount. The logic circuit responds to the output of the auxiliary pulse generator to determine when the lens mount has been moved to the position determined by the pulse train counter to be proper for focusing the subject to be photographed. Such logic circuit response results in engagement of a pawl with a lens mount coupled rack to stop movement of the lens mount at the proper focusing position even though the drive motor may continue to rotate. A slip clutch in the coupling between the motor and the lens mount facilitates this latter operating characteristic.

In the feed-back system disclosed in the aforementioned copending application, the pulses corresponding to lens movement displacement from a pre-established position of focus are preferably generated by rotation of slots or apertures in the lens encoder between a light source, such as a light emitting diode (LED), and a photocell. The increments of angular spacing between the slots or apertures in the encoder are related to increments of lens mount rotation which, because of a pre-established thread or cam pitch of the lens mount represent axial increments of lens focusing movement. This arrangement has a distinct advantage from the standpoint of elimination of frictional or mechanical drag on movement of the lens mount to appropriate focusing positions and as well, it is easily adaptable to electronic circuitry suited for automatic focusing systems.

There are, however, problems presented from the standpoint of the size of the photo-electric feed-back system capable of being accomodated in a viable automatic focusing camera design, facility for assembly in the shutter housing of a camera, calibration of photocell generated pulses with lens mount movement from a given reference position, and elimination of erratic pulse generation due to exposure of the photocell to stray light.

SUMMARY OF THE INVENTION

In accordance with the present invention, an improved mounting and positioning structure is provided for detector units, including a sending element such as a light source and a receiving element such as a photocell whereby such detectors may be positioned easily and precisely in relation to a lens encoder of a camera having an automatic focusing system. The detector is provided with an integral hollow housing supporting the sending and receiving elements on a given axis displaced from and parallel to a pivotal mounting axis of the detector. The housing is insertable directly under a cantilevered resilient latch member having a depending blade-like edge engageable with embossed serrations in the detector housing. The latch retains the detector in a position in which the path between the sending element and the receiving element may be calibrated precisely with the location of the slots or apertures in an encoder.

Among the objects of the present invention are therefore: the provision of an improved photoelectric detector unit for pulse generation in response to movement of a slotted encoder; the provision of an improved mounting structure for such detector units; the provision of such a mounting structure which facilitates assembly of the detector unit in a camera shutter housing; the provision of such a mounting structure which provides for precise calibration of the encoder unit with a reference axis and the provision of such a detector unit and mounting structure which facilitates the use of inexpensive materials and mass production assembly techniques.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
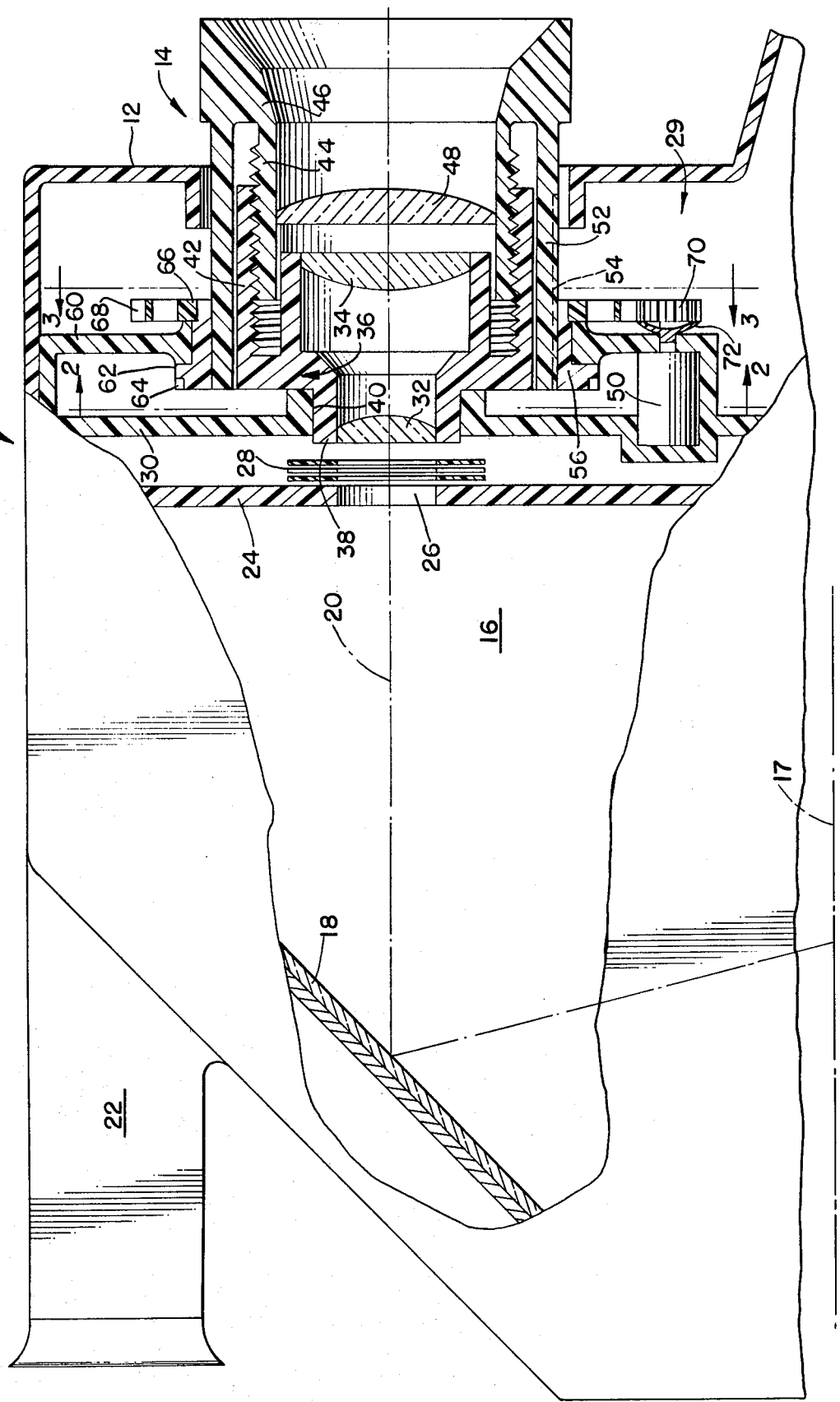
FIG. 1 is a fragmentary cross-section or cutaway side elevation of a camera incorporating the encoder detector of the present invention.

In FIG. 1 of the drawings, a camera incorporating the present invention is shown to include an exterior casing 10 having a front wall 12 through which an objective lens is presented and generally designated by the reference numeral 14 in FIG. 1. The particular embodiment of the camera illustrated is intended as an adaptation of a well-known commercially available camera of the type in which the upper sheet of a film pack (not shown) is presented at a film plane 17 in a light-tight chamber 16 and processed after exposure by withdrawal through pressure rollers or bars (not shown) at the front of the camera. Supported in the chamber 16 is a mirror 18 by which light passing along the optical axis 20 of the lens 14 is reflected downwardly to the film plane as is well-known in the art. Also, a rearwardly extending view-finder tube 22 extends from the rear of the exterior casing 10.

The chamber 16 is delineated at its front edge by a wall 24 having an aperture 26 therein centered on the optical axis 20 and positioned directly behind a shutter blade set 28. The several components of the exposure control system by which the shutter blades 28 are conventionally operated are omitted from the drawings in the interest of more clearly illustrating a structural embodiment of the present invention. Such components, however, will be located in the space between the walls 12 and 30 or within the "shutter housing", a term for the enclosure of such space and designated in FIG. 1 by the reference numeral 29.

Supported within the housing 29, forwardly of the shutter blades 28, is a lens board 30 for supporting the stationary components of the lens 14. In this respect, it will be noted that the lens illustrated is a three-element lens in which two stationary lens elements 32 and 34 are fixed in a cylindrical mount 36, having a rear extension 38 of reduced diameter extending through an appropriately reinforced opening 40 in the lens board 30, and secured permanently against movement relative to the lens board by appropriate means such as ultrasonic fusion, a self-locking spring washer or the like.

The fixed lens mount 36 supports a forwardly projecting, internally threaded cylindrical portion 42 adapted to receive an externally threaded cylindrical portion 44 of a movable lens mount 46 which carries a movable lens element 48. The lens system and mount, as thus described, are conventional and operate to focus a subject image on the film plane 17 upon rotation of the mount 46 to adjust the lens element 48 inwardly or outwardly relative to the element 34. Specifically, an "infinity" adjustment of the lens 14, in which subjects beyond a camera-subject range of approximately 7–9 meters will be in focus, is effected when the lens element 48 is adjusted rearwardly to a pre-established position near the element 34. Subjects closer than this range from the camera will be brought into focus by rotation of the mount 46 in a direction to move the element 48 away from the element 34. Although such focusing adjustments of the lens 14 are conventionally made by manually rotating the lens mount 46 relative to the stationary lens mount 36, usually with the aid of either camera-subject distance calibrations on the mount 46 or with the aid of an optical range finder provided in conjunction with the viewing tube 22, the camera embodiment illustrated in FIG. 1 is adapted for use with an automatic ranging system including an electric drive motor 50. The automatic ranging system for operating the motor 50 is not shown in the drawings nor is a description thereof believed necessary for a complete understanding of the present invention. Acceptable electronic ranging systems are disclosed in U.S. Pat. No. 3,522,764 as well as in the above-mentioned copending application Ser. No. 729,289, the latter being incorporated herein by reference to the extent that the disclosure thereof is necessary for one skilled in the art to practice the present invention.

Figure 2:
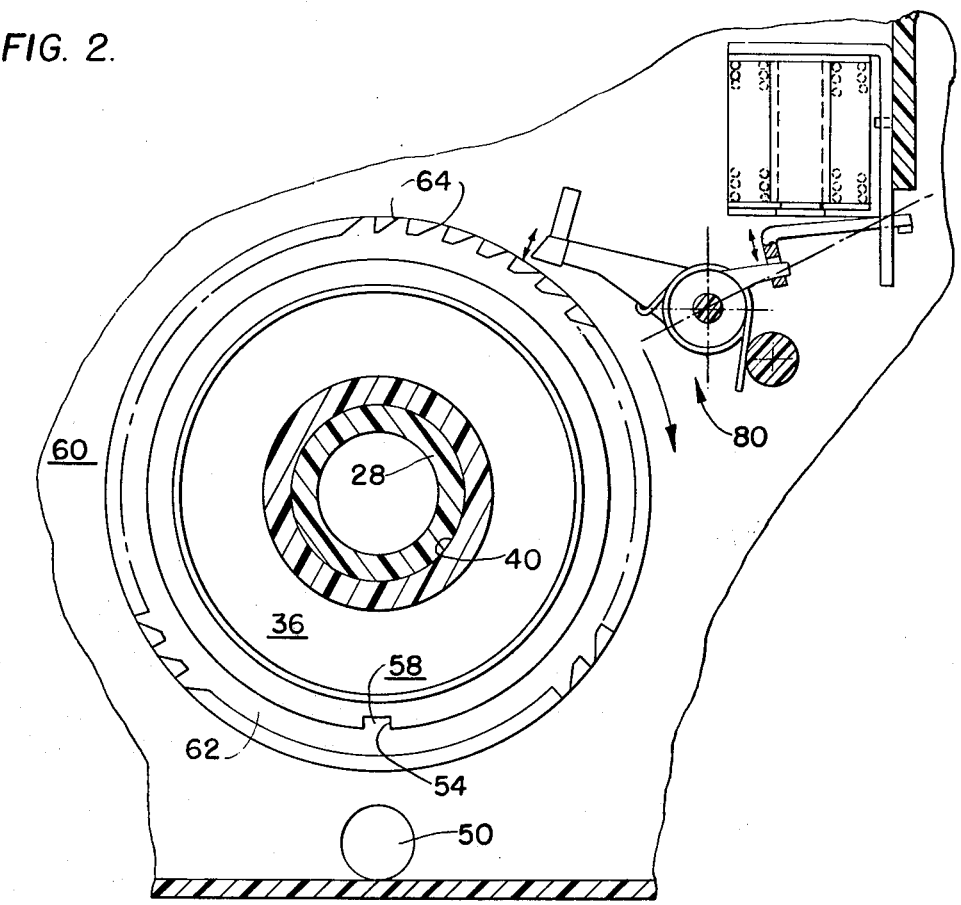
FIG. 2 is an enlarged fragmentary cross-section on line 2—2 of FIG. 1.
Figure 3:
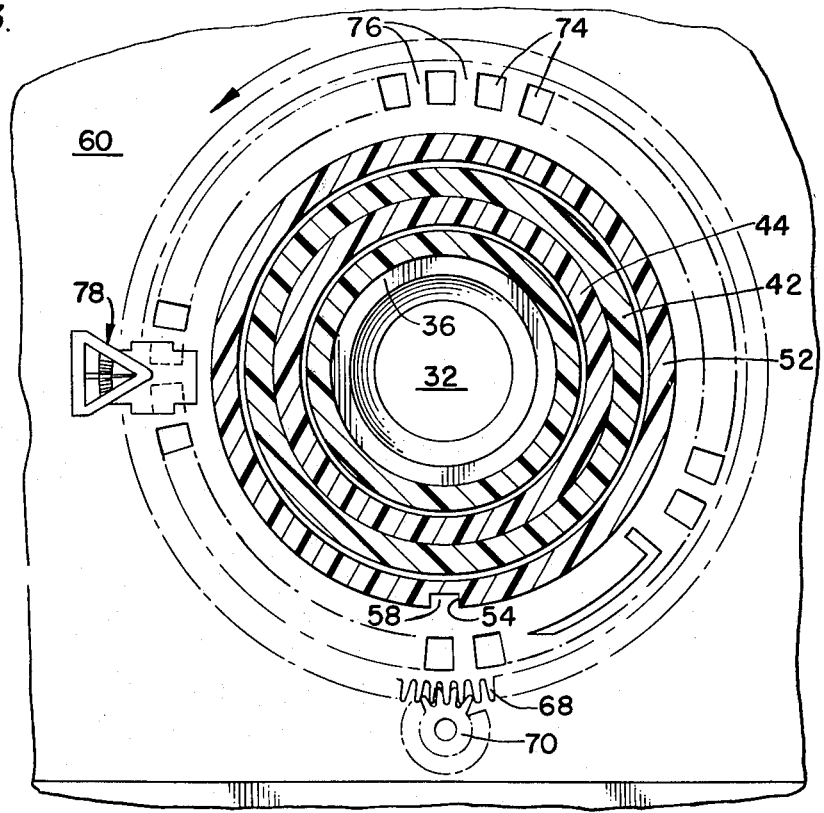
FIG. 3 is a similarly enlarged fragmentary cross-section on line 3—3 of FIG. 1.
Figure 4:
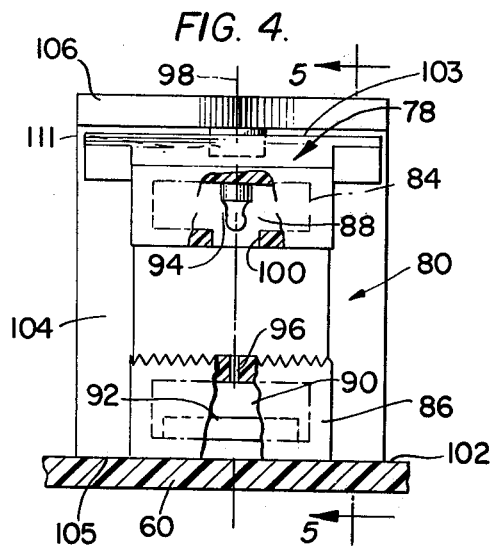
FIG. 4 is a front elevational view, partially cutaway of the detector unit mounted in the camera of FIGS. 1-3.
Figure 5:
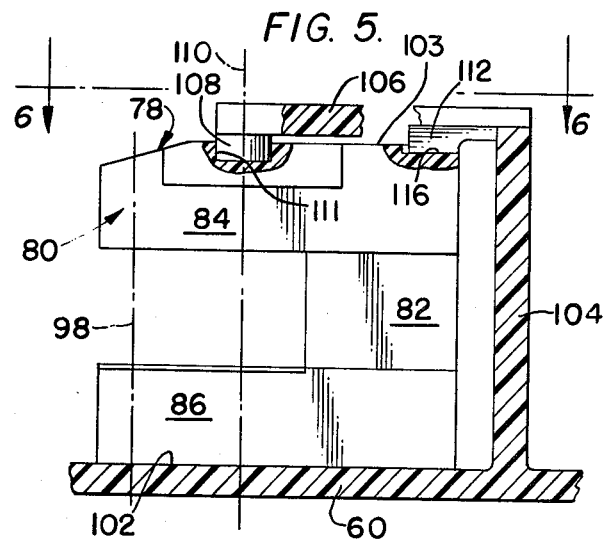
FIG. 5 is a fragmentary cross-section taken on line 5—5 of FIG. 4.

The manner in which the lens mount 46 is coupled for rotation by operation of the motor 50 may be understood by reference to FIGS. 1–3 of the drawings. As shown most clearly in FIG. 1, the lens mount 46 is provided with a rearwardly extending cylindrical sleeve 52 having a longitudinal exterior keyway 54 or equivalent. The sleeve 52 is slidably received within a ring 56 having a tang 58 slidable in the keyway 54. The ring 56 is externally journalled for rotation in an apertured support wall 60 positioned forwardly of the lens board 30 in a manner such that it is retained against axial movement during rotation. In this latter respect, the ring 56 is provided at its rear end with a flange 62 having rack teeth 64 provided thereon. At the forward end of the ring 56, an outwardly projecting encoder wheel 66 is mounted by fusion or the like and in a manner to capture the apertured journal portion of the wall 60 to prevent axial displacement of the ring 56. The encoder ring 66 is provided with external gear teeth 68 for engagement by a gear 70 coupled to the motor 50 by way of a slip clutch 72. In light of this organization it will be appreciated that operation of the motor to rotate the gear 70 will rotate the encoder wheel 66 and ring 56 to rotate the lens mount 46 as a result of the key slot 54 and tab 58. Rotation of the lens mount 46 in this manner will not impede axial displacement of the mount and the lens element 48 as a result of the threaded interconnection of the cylindrical portions 42 and 44.

As described in the afore-mentioned co-pending application Ser. No. 729,289, the logic circuitry of the automatic focusing system disclosed therein, provides appropriate controls by which the motor 50 may be energized to rotate the encoder wheel 66 and the lens mount 46, preferably from its position of infinity, until a subject to be photographed is in focus on the film plane 17 as a result of a range detection facility provided by the system. A determination of when the lens mount has been moved through the appropriate position for focus is provided by an auxiliary pulse generator associated with the lens coupled encoder wheel. In the disclosed embodiment, therefore, the encoder wheel 66 is provided with a series of openings 74 spaced angularly by opaque wheel portions 76 and located to pass in light passing and blocking relationship to a photocell detector unit 78 (See FIG. 3). A solenoid actuated pawl mechanism 80 (FIG. 2) is positioned to engage the rack teeth 64 on the ring 56 to latch the movable lens mount 46 in a properly focused position after the appropriate number of openings 74 have passed the detector unit 78 and generated a corresponding number of auxiliary pulses.

Although the function and operation of the photoelectric detector 78 in the electronic circuitry of the automatic focusing system in which the present invention is particularly adapted, is fully disclosed in the aforementioned co-pending application, the physical structure and positioning of the detector in relation to the encoder wheel 66 is important to satisfactory overall system operation. For compactness of the apparatus and precise indication of the lens position, it is often desirable to space the apertures 74 of the encoder member 66 relatively close to one another. This in turn not only requires a finer or more precise detector beam, but also more precise alignment of the detector 78 with the encoder wheel 66.

Turning now to the detector 78, as shown in FIGS. 4–7 of the drawings, it includes a housing 80 of generally U-shaped configuration to define a base portion 82 from which a pair of leg portions 84 and 86 extend in generally spaced parallel relationship to receive the apertured flange configuration of the encoder wheel 66. The casing 80 is preferably an integral molding of appropriate resinous, opaque material and is hollow to establish the leg portions 84 and 86 which respectively provide a light receiving chamber 88 which includes a light sensitive element 72, such as a phototransistor and light sending chamber 90 which includes a light source 94, such as an LED. The photosensitive element 92 and the source 94 are fixed in view of each other on axis 98 which is defined in part by a small receiving aperture 96 designed to emit light from the source 94 to the interior of the leg 86 and the element 94. The leg 84 is provided with a slot 100 through which light from the source 94 is transmitted from this leg to the aperture 96. In light of this construction, it will be seen that as the encoder wheel 66 (See FIG. 6) is rotated relative to the detector 78, a pulse will be generated by the photocell 94 once each time an opening 74 in the encoder wheel passes the axis 98.

Figure 6:
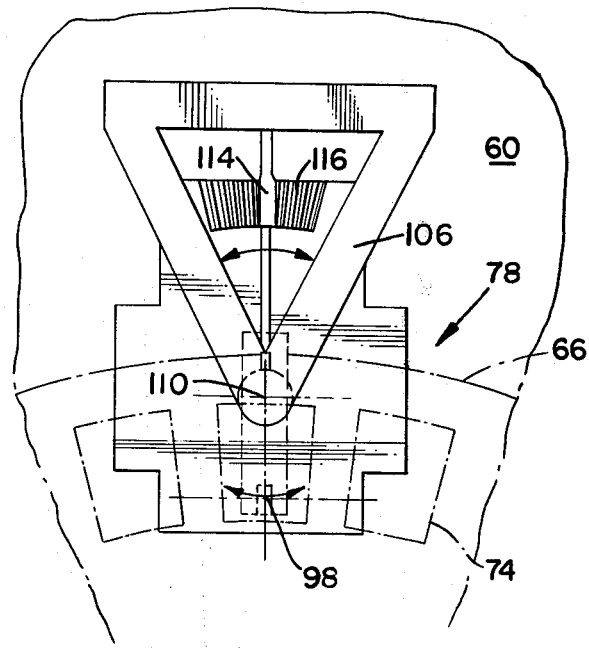
FIG. 6 is a fragmentary plan view as seen on line 6—6 of FIG. 5.
Figure 7:
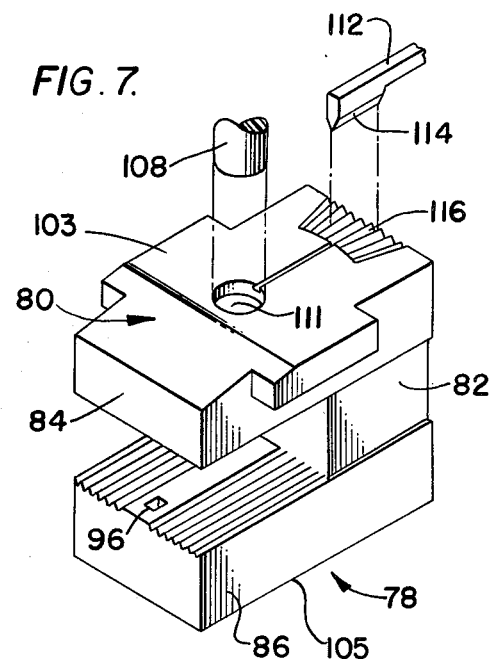
FIG. 7 is an exploded perspective view illustrating the detector unit and mounting organization therefor.

A circular indent or recess 111, carried in the exterior surface 103 of the leg 84 of the detector 78, is as explained below employed in conjunction with the exterior surface 105 of the leg 86 for mounting of the detector. In this respect, the recess 111 defines a pivot axis 110 of the detector 78 which is in spaced parallel relation to the transmission-receive axis 98. To facilitate mounting of the detector 78 in the shutter housing 29 in a manner enabling calibration of the detector 78 with the encoder wheel 66, the support wall 60 is formed, as shown in FIG. 6, with a bearing surface 102 having a projecting stanchion or standard 104 which supports, at its distal end, a cantilevered V-shaped bracket 106. The bracket 106, in turn, carries at its distal end, a depending post 108 engageable in the circular recess 111.

Also cantilevered from the standard 104 is a resilient latch tab 112 having a depending blade portion 114 adapted to engage surface irregularities or serrations 116 embossed in the outer surface 103 of the leg 84. The serrations 116 radiate from the axis 110 and are located in a position of eccentricity with respect to the axes 98 and 110.

In light of this mounting organization for the detector 78, it will be seen that the detector may be inserted as a unit merely by lifting the bracket 106 or that is, by flexing the standard 104 sufficiently to raise the depending post 108 to allow it to slide over the housing 108 until it engages the circular recess 111. Upon such insertion, the resilient latch 112 will engage the serrations 116. At this time, the natural spring of the bracket 106 and the stanchion 104 maintain the post 108 in the pivot recess 111 and the surface 105 against the support surface 102. The final adjustment of the detector to calibrate the axis 98 to a reference point is made by pivoting the detector unit 78 on the axis 110. Calibrated positioning of the unit in this manner will be retained by engagement of the blade 114 in the serrations 116.

Thus it will be seen that as a result of the present invention, a highly effective photoelectric detector mounting arrangement is provided by which the above-mentioned objectives are completely fulfilled. Since it will be apparent to those skilled in the art various changes and/or modifications may be made in the disclosed embodiment without departure from the inventive concepts manifested thereby, it is expressly intended that the foregoing description is illustrative of a preferred embodiment only, not limiting, and that the true spirit and scope of the present invention be determined by reference to the appended claims.

What is claimed is:

1. In a pulse generating system including an encoder with alternate light passing and light blocking portions movable in a predetermined path and a detector unit having a housing carrying a light emitting and a light sensitive element disposed on opposite sides of said encoder and on a first axis intersecting said predetermined path, the improvement comprising:

said housing including a circular recess and a plurality of serrations located in a given exterior surface normal to said first axis, said recess being spaced from said first axis so as to provide a pivot axis of said housing spaced from the axis of said elements;

means for mounting said detector unit for pivotal movement about said pivot axis, said mounting means including a bearing surface for supporting the surface of said detector unit opposite said given surface, a stanchion projecting from said bearing surface, a bracket cantilevered from the distal end of said stanchion, and a depending post located at the distal end of said bracket and engageable with said recess to retain said unit on said bearing surface and permit pivotal motion thereof; and resilient retention means for holding the detector unit in a pre-established angular orientation about said pivot axis to calibrate the location of said detector unit relative to said encoder, said retention means including a resilient tab cantilevered from said distal end of said stanchion with a blade-like formation depending therefrom for engagement with said serrations.

2. The improvement of claim 1 wherein said bracket is spaced from said bearing surface a distance such that said bracket must be flexed during insertion of said post in said recess and the natural spring of said bracket maintains the post in said recess and said detector unit urged against said bearing surface.

* * * * *